United States Patent
Kikuchi et al.

(10) Patent No.: US 10,461,619 B2
(45) Date of Patent: Oct. 29, 2019

(54) MOTOR, AND ELECTRIC POWER STEERING APPARATUS AND VEHICLE IN WHICH SAID MOTOR IS MOUNTED

(71) Applicant: NSK Ltd., Tokyo (JP)

(72) Inventors: Yusuke Kikuchi, Fujisawa (JP); Zhipeng Tu, Fujisawa (JP); Gen Kimura, Fujisawa (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 327 days.

(21) Appl. No.: 15/532,783

(22) PCT Filed: Nov. 30, 2015

(86) PCT No.: PCT/JP2015/083532
§ 371 (c)(1),
(2) Date: Jun. 21, 2017

(87) PCT Pub. No.: WO2016/088698
PCT Pub. Date: Jun. 9, 2016

(65) Prior Publication Data
US 2017/0366076 A1    Dec. 21, 2017

(30) Foreign Application Priority Data

Dec. 2, 2014   (JP) ................. 2014-244346

(51) Int. Cl.
*H02K 29/03*    (2006.01)
*B62D 5/04*    (2006.01)
(Continued)

(52) U.S. Cl.
CPC .............. *H02K 29/03* (2013.01); *B62D 5/04* (2013.01); *B62D 5/0403* (2013.01); *H02K 1/246* (2013.01); *H02K 1/278* (2013.01); *H02K 2213/03* (2013.01)

(58) Field of Classification Search
CPC ........ H02K 29/03; H02K 1/246; H02K 1/278; H02K 2213/03; B62D 5/04; B62D 5/043
See application file for complete search history.

(56) References Cited

U.S. PATENT DOCUMENTS

2010/0117475 A1    5/2010    Leonardi et al.

FOREIGN PATENT DOCUMENTS

| JP | 07-039031 A | 2/1995 |
| JP | 2008-072838 A | 3/2008 |

(Continued)

OTHER PUBLICATIONS

Written Opinion of the International Searching Authority of PCT/JP2015/083532 dated Mar. 1, 2016.

(Continued)

*Primary Examiner* — Ramon M Barrera
(74) *Attorney, Agent, or Firm* — Sughrue Mion, PLLC (57) ABSTRACT

[Problem]
An object of the present invention is to provide the motor which is possible to obtain the skew effect within the rotor gap surface by arranging the respective magnetic pole pitches at imbalance positions without causing the increasing of the magnet machining cost and the rotor assembly time, and the electric power steering apparatus equipped with the motor and a vehicle.
[Means for Solving the Problem]
The present invention is a motor that has a skew effect within a rotor gap surface of a mechanical angle one-cycle, wherein a rotor magnetic pole comprises plural magnetic salient pole portions by means of magnetic material, an N-pole and an S-pole magnets are alternately arranged on a rotor surface between the magnetic salient pole portions, and magnetic pole pitches of an electrical angle one-cycle, which comprise the magnetic salient pole portions and the N-pole and the S-pole magnets, are unevenly arranged.

8 Claims, 7 Drawing Sheets

(51) Int. Cl.
*H02K 1/24* (2006.01)
*H02K 1/27* (2006.01)

(56) References Cited

FOREIGN PATENT DOCUMENTS

| | | |
|---|---|---|
| JP | 2010-119287 A | 5/2010 |
| JP | 2013-132154 A | 7/2013 |
| JP | 2014-155372 A | 8/2014 |
| WO | 86/01652 A1 | 3/1986 |
| WO | 2011/127960 A1 | 10/2011 |

OTHER PUBLICATIONS

International Search Report of PCT/JP2015/083532 dated Mar. 1, 2016.

FIG.1

PRIOR ART

PRIOR ART

FIG.4

PRIOR ART

MOTOR, AND ELECTRIC POWER STEERING APPARATUS AND VEHICLE IN WHICH SAID MOTOR IS MOUNTED

CROSS REFERENCE TO RELATED APPLICATIONS

This application is a National Stage of International Application No. PCT/JP20015/083532 filed Nov. 30, 2015, claiming priority based on Japanese Patent Application No. 2014-244346, filed Dec. 2, 2014, the contents of all of which are incorporated herein by reference in their entirety.

TECHNICAL FIELD

The present invention relates to a motor that a rotor magnetic pole comprises plural magnetic salient pole portions by means of magnetic material, N-pole magnets and S-pole magnets are alternately arranged on a rotor surface between the magnetic salient pole portions, and the motor has a generation mechanism due to a magnet torque and a reluctance torque, and to an electric power steering apparatus equipped with the motor and a vehicle, and in particular to relates to a concentrated winding motor having a skew effect and the electric power steering apparatus equipped with the same and the vehicle.

The electric power steering apparatus mounted on the vehicle applies an assist power by using the motor (e.g. a brushless 3-phase motor) to a steering system of the vehicle by means of a current command value calculated based on a steering torque at least, and is drive-controlled by an inverter comprising a bridge circuit.

BACKGROUND ART

An electric power steering apparatus (EPS) serves as an apparatus where a driving section is equipped with a motor. The electric power steering apparatus provides a steering mechanism of a vehicle with a steering assist force (an assist force) by means of a rotational force of the motor, and applies a motor driving force controlled with an electric power supplied from an inverter as the steering assist force to a steering shaft or a rack shaft by means of a transmission mechanism such as gears. In order to accurately generate the assist torque of the steering assist force, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of a pulse width modulation (PWM)-control. A brushless motor that is superior in maintainability is commonly used as the motor.

Figure 1:
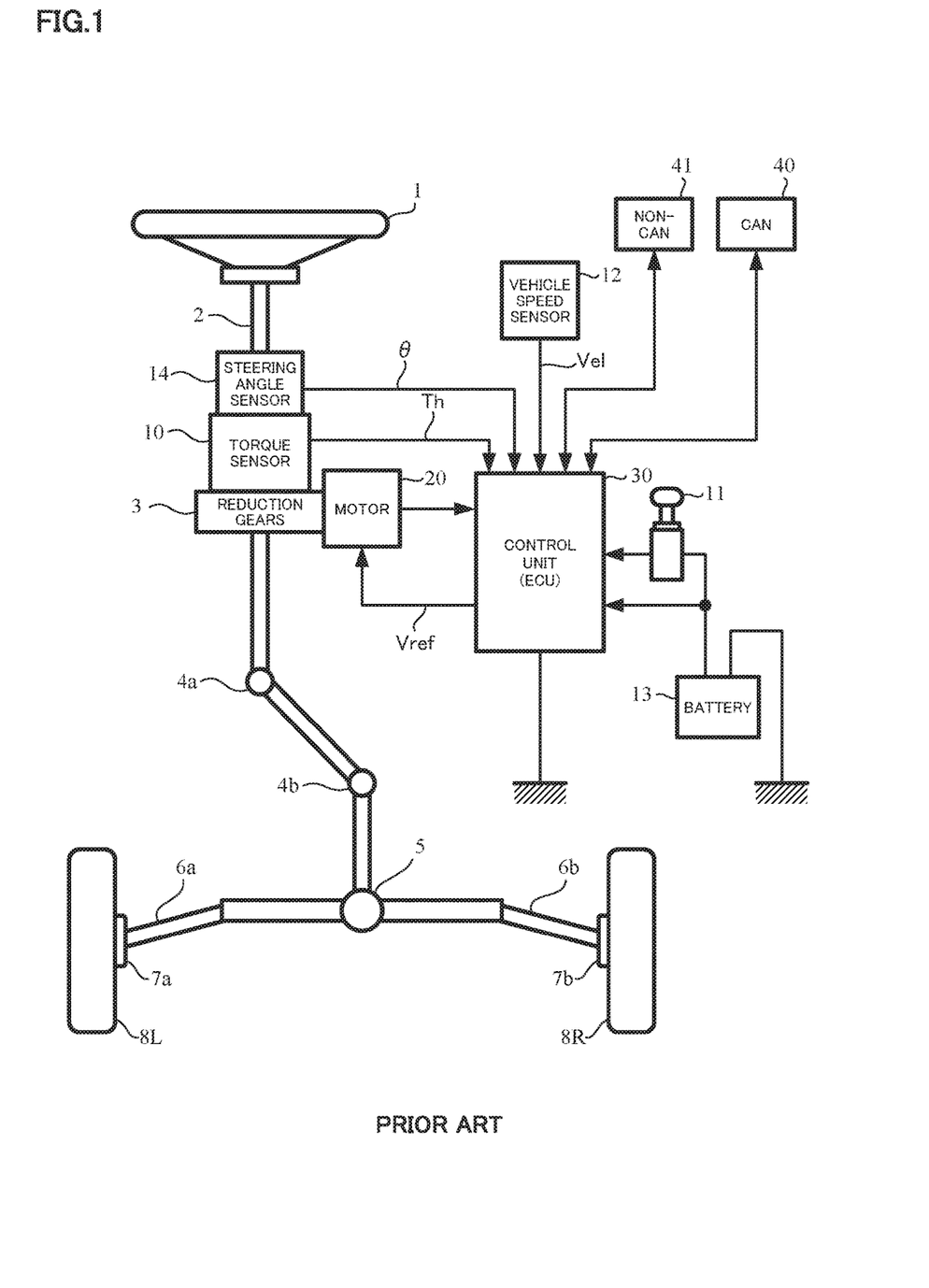
FIG. 1 is a configuration diagram showing an outline of an electric power steering apparatus.

A general configuration of the conventional electric power steering apparatus will be described with reference to FIG. 1. As shown in FIG. 1, a column shaft (a steering shaft, a handle shaft) 2 connected to a steering wheel (a handle) 1 is connected to steered wheels 8L and 8R through reduction gears 3 in a reducing section, universal joints 4a and 4b, a rack and pinion mechanism 5, tie rods 6a and 6b, further via hub units 7a and 7b. In addition, the column shaft 2 is provided with a torque sensor 10 for detecting a steering torque Th of the steering wheel 1 and a steering angle sensor 14 for detecting a steering angel θ, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist (a steering assist) command based on the steering torque Th detected by the torque sensor 10 and a vehicle speed Vel detected by a vehicle speed sensor 12, and controls a current supplied to the motor 20 for EPS based on a voltage control command value Vref obtained by performing compensation and so on with respect to the current command value.

As well, the steering angle sensor 14 is not indispensable and may not be provided, and it is possible to obtain the steering angle from a rotational position sensor such as a resolver connected to the motor 20.

A controller area network (CAN) 40 to send/receive various information and signals on the vehicle is connected to the control unit 30, and it is also possible to receive the vehicle speed Vs from the CAN 40. Further, it is also possible to connect a non-CAN 41 to the control unit 30 sending/receiving a communication, analog/digital signals, a radio wave or the like except the CAN 40 to the control unit 30.

Figure 2:
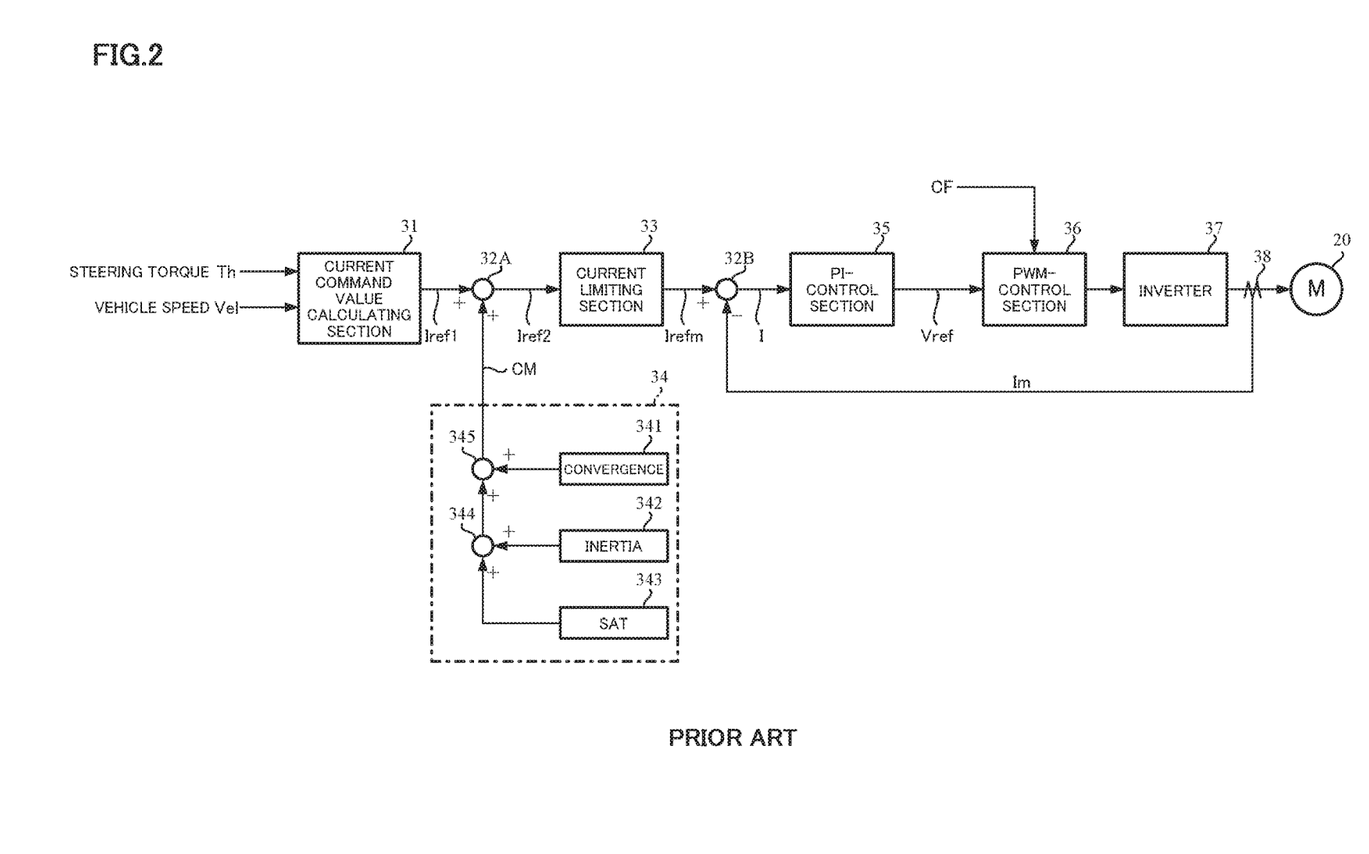
FIG. 2 is a block diagram showing a constitutional example of a control unit (ECU) of the electric power steering apparatus.

The control unit 30 mainly comprises a CPU (Central Processing Unit) (including an MCU (Micro Controller Unit), an MPU (Micro Processor Unit) and so on), and general functions performed by programs within the CPU are shown in FIG. 2.

Functions and operations of the control unit 30 will be described with reference to FIG. 2. As shown in FIG. 2, the steering torque Th detected by the torque sensor 10 and the vehicle speed Vs detected by the vehicle speed sensor 12 (or from the CAN 40) are inputted into a current command value calculating section 31 calculating a current command value Iref1. The current command value calculating section 31 calculates the current command value Iref1 that is a control target value of a current supplied to the motor 20 based on the steering torque Th and the vehicle speed Vel and by means of an assist map or the like. The current command value Iref1 is inputted into a current limiting section 33 through an adding section 32A. A current command value Irefm limited the maximum current is inputted into a subtracting section 32B, and a deviation I (=Irefm−Im) between the current command value Irefm and a motor current value Im being fed back is calculated. The deviation I is inputted into a proportional-integral (PI)-control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37 serving as a driving section. The motor current value Im of the motor 20 is detected by a motor current detector 38 and is fed back to the subtracting section 32B. The inverter 37 uses field effect transistors (FETs) as driving elements and is comprised of a bridge circuit of FETs.

A compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 343 and an inertia 342 in an adding section 344, further adds the result of addition performed in the adding section 344 with a convergence 341 in an adding section 345, and then outputs the result of addition performed in the adding section 345 as the compensation signal CM.

Such a motor used in the electric power steering apparatus is generally a brushless synchronous type motor, a rotor of the synchronous type motor is provided with permanent magnets on a surface or inside of the rotor and is rotated by an interaction between the permanent magnets and a rotating magnetic field generated by a coil wound on slots of a stator side. An axis which a magnetic flux formed by the permanent magnets penetrates the rotor in a diameter direction is named a d-axis, and an axis which a magnetic flux formed by a stator coil of the stator penetrates the rotor in a diameter direction is named a q-axis. There is also a motor effectively using a reluctance torque (a reaction torque) by increasing an inductance Lq of a vertical axis (the q-axis) greater than an inductance Ld of the d-axis, while the magnetic flux of a horizontal axis (the d-axis) direction due to an armature current passes smoothly in a rotor iron core by arranging salient pole portions between the permanent magnetics mounted on the rotor circumference.

Figure 3:
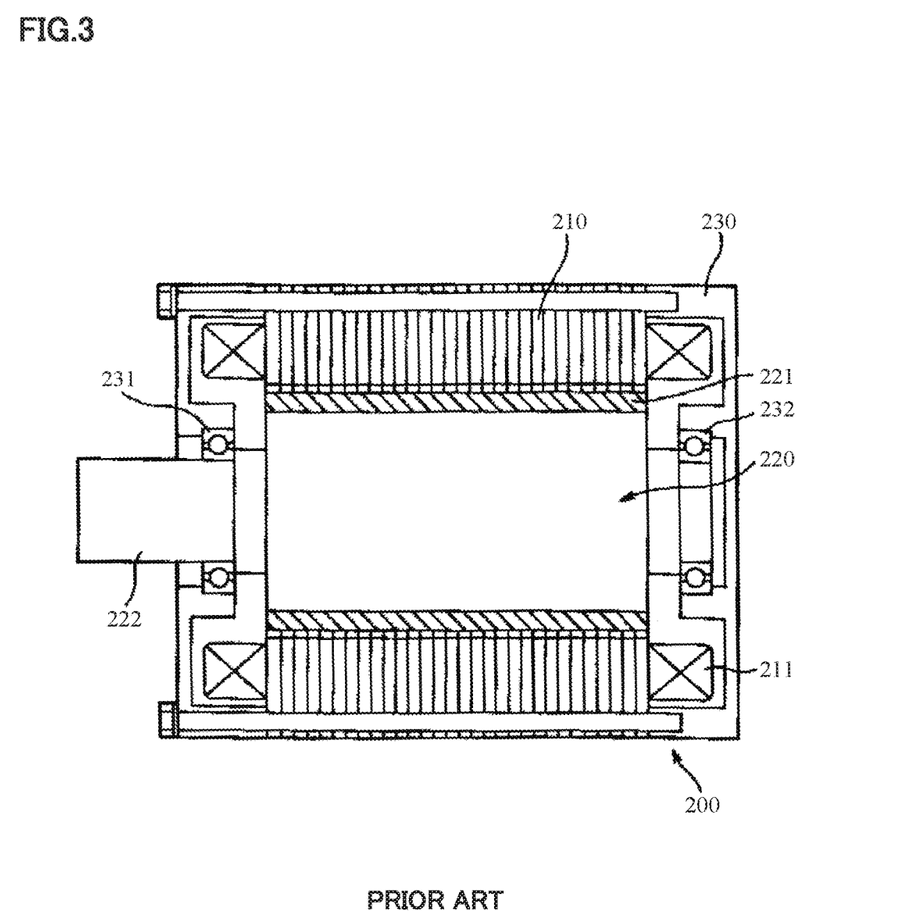
FIG. 3 is a longitudinal sectional view showing a structure example of a general synchronous type motor.

An overall structure of a general three-phase synchronous motor 200 will be explained with reference to FIG. 3, the three-phase synchronous motor 200 comprises a stator on which a coil 211 is wound, a rotor 220, and a case 230 for containing them. A circumference surface of the rotor 220 is provided with permanent magnets 221, and a rotational shaft 222 of the shaft center is rotatably and pivotally supported by bearings 231 and 232 mounted in the case 230.

An output torque Ts of such the synchronous type motor using the permanent magnets is obtained by the below Equation 1.

$$Ts=Tm+Tr \quad \text{[Equation 1]}$$

where, Tm is a torque due to a magnetic flux $\phi m$ of the permanent magnet, and Tr is a reluctance torque.
The reluctance torque Tr is obtained by the below Equation 2.

$$Tr=P(Lq-Ld) \cdot Iq \cdot Id \quad \text{[Equation 2]}$$

where, P is number of pole pairs, Lq is a q-axis inductance, Ld is a d-axis inductance, and Iq and Id are respective axis components of the armature current.
From the Equation 2, in general, it is understood that it is capable of increasing the reluctance torque Tr when the q-axis inductance Lq is great and the d-axis inductance Ld is small. As well, the torque Tm due to the permanent magnets is formed by the following Equation 3.

$$Tm=\phi m \cdot Iq \quad \text{[Equation 3]}$$

However, the general synchronous type motor having the salient pole portions stays that a little investigation is added with regard to the shape, the arrangement and so on of the salient pole, and it would be difficult to sufficiently apply the investigation on a rotor structure utilizing the reluctance torque Tr at the maximum. Therefore, room to increase the output torque Ts of the motor and to miniaturize the motor shape at the same torque is remained by effectively using the reluctance torque Tr.

A synchronous type motor for solving such the problem is, for example, described in Japanese Unexamined Patent Publication No. 07-39031 A (Patent Document 1).

Figure 4:
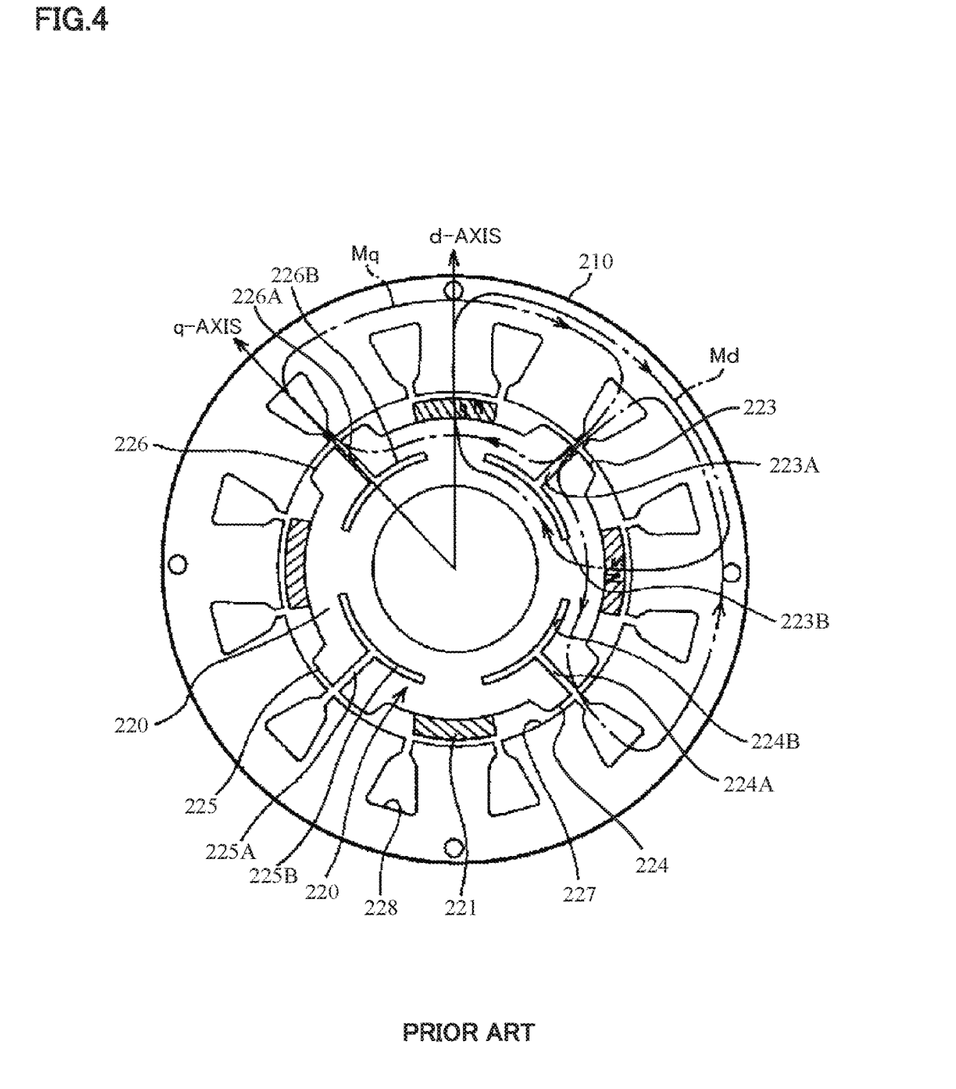
FIG. 4 is a cross sectional view showing an example of a conventional synchronous type motor.

With regard to the synchronous type motor described in Patent Document 1, as shown in FIG. 4, the rotor 220 comprises four salient pole portions 223 to 226 at orthogonal positions, and respective centers of the salient pole portions 223 to 226 are provide with slits 223A to 226A. Further, inner circumference-side end portions of the slits 223A to 226A are respectively extended to a circumference direction of the rotor 220 and form circumference direction slits 223B to 226B. An outer circumference surface of the rotor 220, which is intermediate positions of the salient pole portions 223 to 226, is provided with the permanent magnets 221 throughout a shaft direction. As well, any the salient pole portions 223 to 226 are made from the magnetic material having a high magnetic permeability.

The slit is air gap for the magnetic flux, and the magnetic permeability is low. Since the magnetic flux attempts to form a magnetic path so as to avoid the slits 223A to 226A being the air gap, a magnetic path Md being formed by the permanent magnets 221 passes the further inner circumference side than the circumference direction slits 223B to 226B and passes from respective teeth 227 against the permanent magnets 221 to a yoke site of the stator 210. Since the salient pole portions 223 to 226 present between the two permanent magnets 211 are divided at a diameter direction by the slits 223A to 226A serving as the air gap, a small loop-shape magnetic path is not formed in the inner site of the respective salient pole portions 223 to 226. Therefore, the d-axis inductance Ld becomes much smaller. On the other hand, a magnet path Mq which is formed in order to pass the salient pole portions 223 to 226 due to the conducting toward the stator coil passes the outer circumference side of the circumference direction slits 223B to 226B and further passes from slots 228 opposite to the respective salient pole portions 223 to 226 to the yoke site. The q-axis inductance Lq is substantially larger than the d-axis inductance Ld.

As a result, since the reluctance torque Tr becomes greater, the distance (Lq-Ld) becomes greater based on the above Equation 2, and the output torque Ts of the synchronous type motor increases greater than the torque having the conventional simple salient pole portions.

THE LIST OF PRIOR ART DOCUMENTS

Patent Document

Patent Document 1: Japanese Unexamined Patent Publication No. H07-39031 A
Patent Document 2: Japanese Unexamined Patent Publication No. 2008-72838 A

SUMMARY OF THE INVENTION

Problems to be solved by the Invention

The rotor structure of the motor described in Patent Document 1 comprises the permanent magnets and plural magnetic salient pole portions, and therefore it is possible to enlarge the output torque. However, in the synchronous type motor of Patent Document 1, since the reluctance is generated due to a relative position between the stator and the slots of the rotor and a magnetomotive force in step-wise changes at the slot positions, the torque ripple is occurred.

Because a noise or a vibration due to the torque ripple is strictly limited in the motor used for the electric power steering apparatus, it is impossible to immediately mount the synchronous type motor disclosed in Patent Document 1 on the electric power steering apparatus.

A method to skew the stator or the rotor is known (for example, Japanese Unexamined Patent Publication No. 2008-72838 A (Patent Document 2)) in case of realizing a low-noise operation by reducing the torque ripple or the cogging torque of the synchronous type motor, and it is necessary to artificially skew the stator or the rotor in case of mounting the motor described in Patent Document 1 on the electric power steering apparatus. Since a characteristic of a continuous skew has a smooth changing of the magnetic flux against the pseudo-skew, the effects of the low noise and low vibration are great. However, the pseudo-skew is often performed in the productive view.

However, even if the continuous skew also increases the manufacturing cost from a motor assembling process, the pseudo-skew is also complicated in the motor assembling process. That is, for a countermeasure of the torque ripple and the cogging torque, since the torque ripple reduction by the step skew is aimed by dividing the rotor into a predetermined number toward the axis direction, a magnet machining cost increases based on increasing of the magnet number and a rotor assembly time also increases.

The present invention has been developed in view of the above-described circumstances, and it is an object of the present invention is to provide a motor which is possible to obtain the skew effect within the rotor gap surface of a mechanical angle one-cycle by arranging the respective magnetic pole pitches at imbalance positions without causing the increasing of the magnet machining cost and the rotor assembly time, and to an electric power steering apparatus equipped with the motor and a vehicle.

Means for Solving the Problems

The present invention relates to a motor, wherein a rotor magnetic pole comprises plural magnetic salient pole portions by means of magnetic material, an N-pole magnet and an S-pole magnet are alternately arranged on a rotor surface between the magnetic salient pole portions, and magnetic pole pitches of an electrical angle one-cycle, which comprise the magnetic salient pole portions and the N-pole magnet and the S-pole magnet, are unevenly arranged, and the above-described object of the present invention is achieved by having a skew effect within a rotor gap surface of a mechanical angle one-cycle, or having a skew effect by being line-symmetrically magnetic pole-arranged at the range of a mechanical angle 180°.

The above-described object of the present invention is achieved by that: wherein a rotor magnetic pole comprises plural magnetic salient pole portions by means of magnetic material, N-pole magnets and S-pole magnets are alternately arranged on a rotor surface between the magnetic salient pole portions, magnetic pole pitches for an electrical angle one-cycle, which comprise the magnetic salient pole portions and the N-pole magnets and the S-pole magnets, are evenly arranged, and by considering a rotor structure of the magnetic pole pitches of the electrical angle one-cycle to one stack, the rotor is skew-arranged in a motor circumference direction at a predetermined angle for every one or plural stack(s).

Effects Of The Invention

According to the motor of the present invention, since the respective magnetic pole pitches are comprised at the imbalance arrangement or are evenly arranged with skew-arrangement at the predetermined angle toward the circumferential direction as one stack, it is possible to obtain the skew effect within the surface and to reduce the reduction of the torque ripple and the cogging torque. In comparison with the step skew structure, since the magnet does not need to be divided, it is possible to reduce the magnet number. As a result, it is possible to reduce the magnet machining cost and the rotor assembly time.

Furthermore, it is possible to realize an inexpensive and high output characteristic by applying the motor to the electric power steering apparatus, and it is possible to achieve the further cost down of the vehicle by mounting the electric power steering apparatus on the vehicle.

BRIEF DESCRIPTION OF THE DRAWINGS

In the accompanying drawings.

MODE FOR CARRYING OUT THE INVENTION

Figure 5:
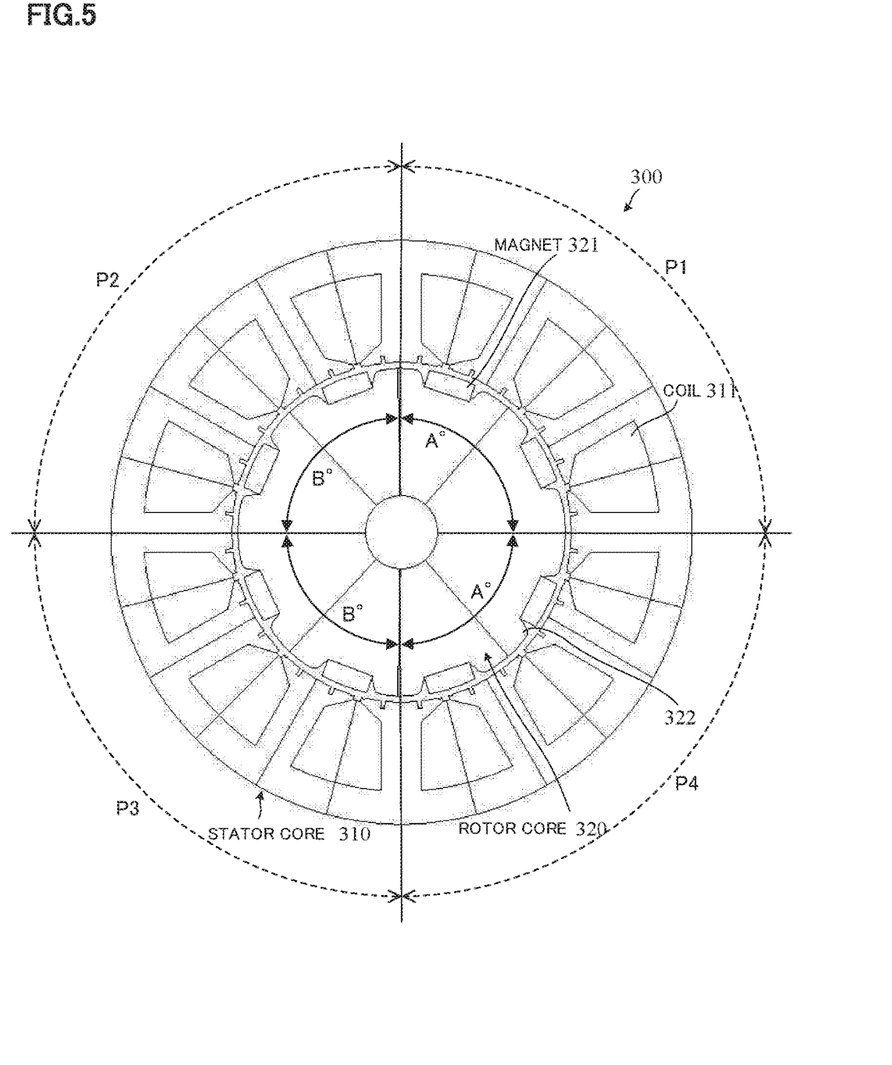
FIG. 5 is a cross sectional view showing an example of a motor of the present invention.
Figure 6:
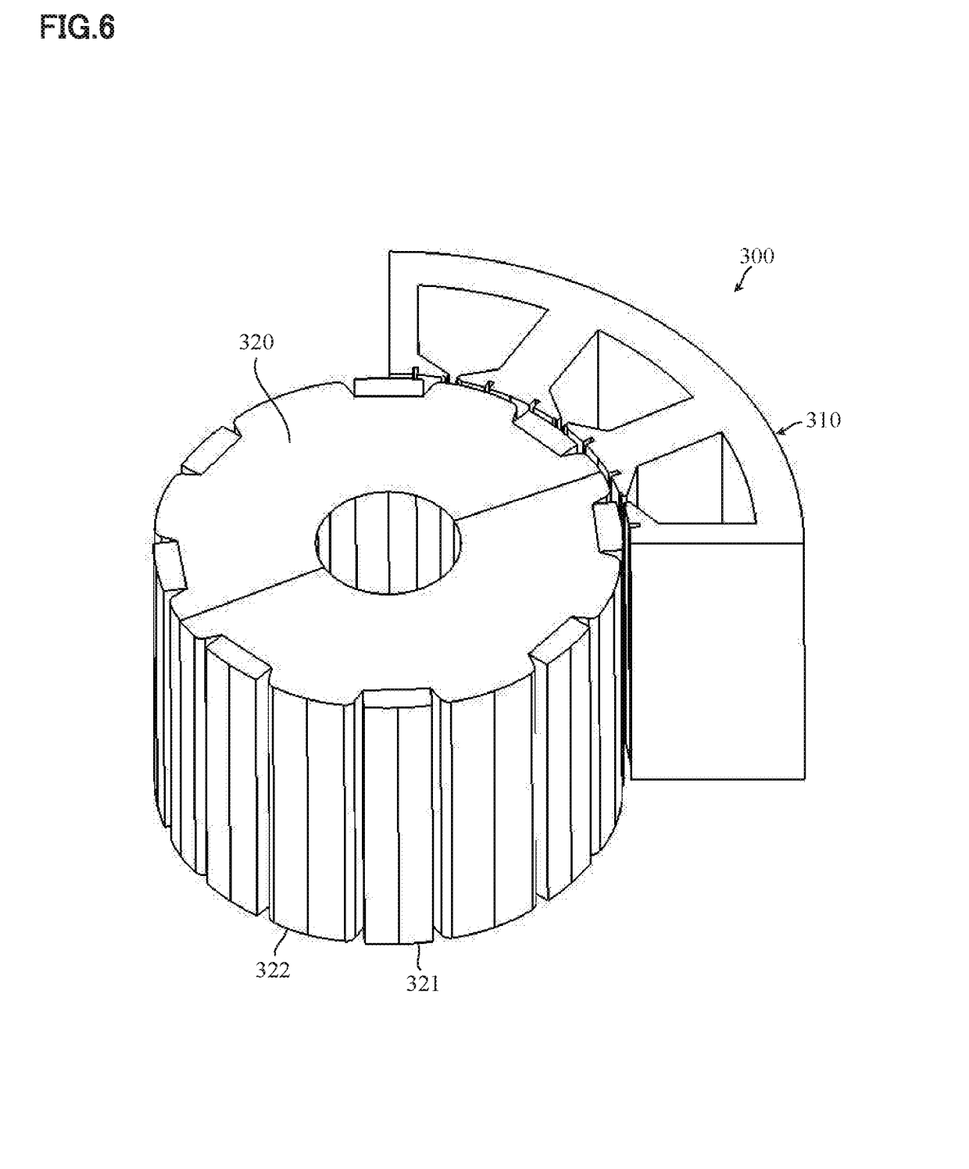
FIG. 6 is a part of sectional schematic view showing a constitutional example of the motor of the present invention.

A motor of the present invention is a synchronous type motor having a torque generation mechanism due to a magnet torque and a reluctance torque. A three-phase synchronous type motor 300 according to the present invention comprises, as shown in FIG. 5 and FIG. 6, a stator 310 of which a coil 311 is wound (concentrated winding) in slots, a rotor 320 of which plural permanent magnets 321 (N-pole and S-pole) are provided on an outer circumference surface, and a case (not shown) for containing them. On the outer circumference surface of the rotor 320, plural permanent magnets 321 are mounted as well as plural magnetic salient pole portions 322 by means of magnetic material are mounted. Besides, FIG. 5 and FIG. 6 show the stator 310 of the state that the coil 311 is not wound.

With regard to the permanent magnets 321, the N-pole magnets and the S-pole magnets are alternately arranged between the magnetic salient pole portions 322. Here, four cycles of an electric angle are equivalent to a one cycle of a mechanical angle, and the magnetic pole pitches P1 to P4 of the electric angle are unevenly arranged. That is, the mechanical angles of the magnetic pole pitches P1 and P4 are A° and the mechanical angles of the magnetic pole pitches P2 and P3 are B° (≠A°), and the magnetic pole pitches P1 to P4 of the electric angle are unevenly arranged. In this way, the motor has a skew effect within the rotor gap surface of the mechanical angle one-cycle.

As well, in FIG. 5, the magnetic pole pitches P1 and P4 are A°, and the magnetic pole pitches P2 and P3 are B°.

Hereinafter, the present invention will be explained why the motor of the present invention, in which the magnetic pole pitches are unevenly arranged, has the skew effect.

As the above motor torque calculation (Equation 2) suggests, the motor torque can be thought by dividing into the respective P1, P2, P3, P4 magnetic pole pairs over the circumference direction as shown in FIG. 5. Whereas phases of armature rotational magnetic fields corresponding to the respective magnetic pole pairs are equal, a sum of a reluctance torque, when β=0 and assuming Tr1 to Tr4 as the reluctance torques of the first to the fourth magnetic pole pairs, the below Equation 4 establishes by leading or delaying (the Equation 6) the phase of the magnet magnetic field of the rotor side.

$$Tr1+Tr2+Tr3+Tr4=0 \quad \text{[Equation 4]}$$

The skew effect is accordingly caused to the rotor. A motor torque Ts is represented by the follow Equation 5, when assuming each torque of the first to the fourth magnetic pole pairs Tp1 to Tp4.

$$Ts=Tp1+Tp2+Tp3+Tp4 \quad \text{[Equation 5]}$$

however, Tp1=Tm1+Tr1, Tp2=Tm2+Tr2, Tp3=Tm3+Tr3, Tp4=Tm4+Tr4.

Moreover, magnet torques Tm1 to Tm4 of the first to the fourth magnetic pole pairs and reluctance torques Tr1 to Tr4 of the first to the fourth magnetic pole pairs in the above Equation 5 are respectively represented by the following Equation 6.

$$Tm1=\Phi m \times Ia \times \cos(\beta-\delta)$$

$$Tr1=(Lq-Ld) \times Ia^2 \times \sin(\beta-\delta) \times \cos(\beta-\delta)$$

$$Tm2=\Phi m \times Ia \times \cos(\beta+\delta)$$

$$Tr2=(Lq-Ld) \times Ia^2 \times \sin(\beta+\delta) \times \cos(\beta+\delta)$$

$$Tm3=\Phi m \times Ia \times \cos(\beta+\delta)$$

$$Tr3=(Lq-Ld) \times Ia^2 \times \sin(\beta+\delta) \times \cos(\beta+\delta)$$

$$Tm4=\Phi m \times Ia \times \cos(\beta-\delta)$$

$$Tr4=(Lq-Ld) \times Ia^2 \times \sin(\beta-\delta) \times \cos(\beta-\delta)tm \quad \text{[Equation 6]}$$

where, Φm is a magnet magnetic flux total-amount of the respective magnetic pole pairs, Ia is an amplitude value of an input current, β is a lead angle of a rotational magnetic field for the rotor d-axis, and δ is a rotor lead angle relative to a phase of the rotational magnetic field.

Since the skew effect is obtained within the rotor gap surface of the mechanical angle one-cycle, it is possible to reduce the torque ripple and the cogging torque, reduce the number of the magnets in comparison with the step skew structure, and reduce the machining cost of magnets and the rotor assembly time.

Moreover, in the present invention, the magnetic pole pitches P1 to P4 of the electrical angle one-cycle, which comprises of the magnetic salient pole portions 322 and the N-pole magnets and the S-pole magnets, are unevenly arranged, and the magnetic pole pitches P2 and P4 are line-symmetrically (equiangularly) arranged at the range of the mechanical angle 180°, herewith, the skew effect is obtained. In case of regarding the synthesis of the torques of the magnetic pole pitches P1 and P2 as one synthetic magnetic pole Pa while regarding the synthesis of the torques of the magnetic pole pitches P3 and P4 as another one synthetic magnetic pole Pb, it is equivalent to stagger the phases of the synthetic magnetic poles Pa and Pb on a 180°-symmetrical structure as shown in FIG. 5. As a result, it is equivalent to perform the skew between the synthetic magnetic poles Pa and Pb. Thus, it is possible to obtain the further reduction effect of the torque ripple.

Figure 7:
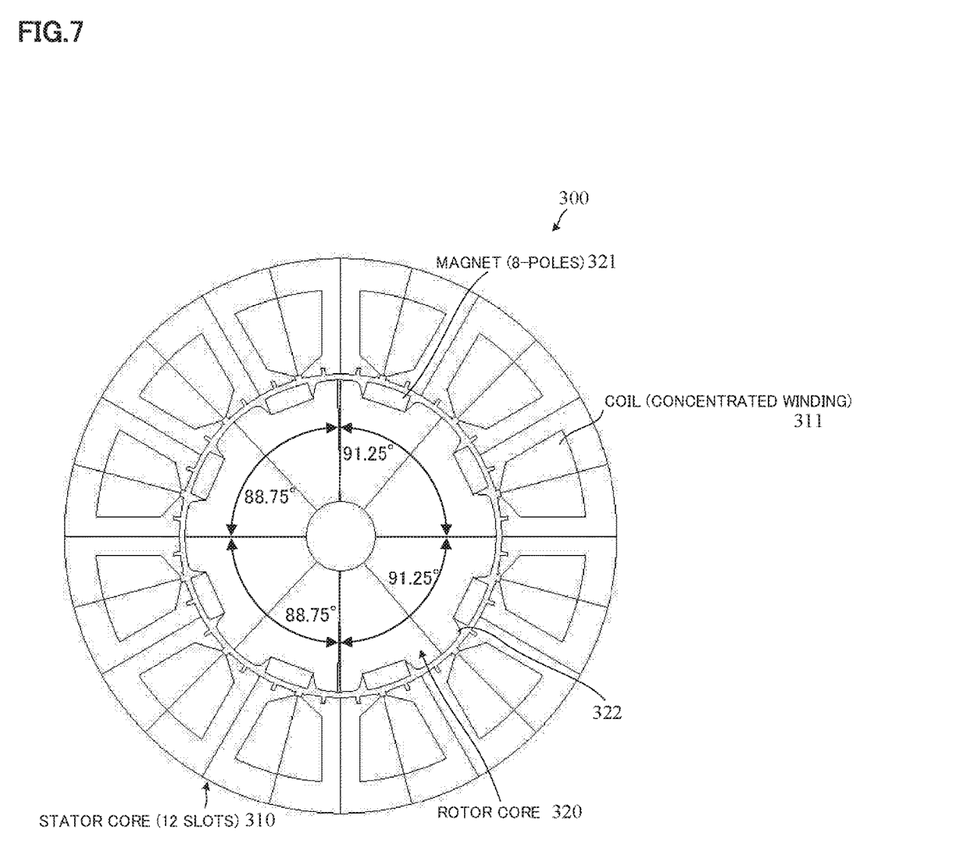
FIG. 7 is a traverse cross sectional view showing a constitutional example of the motor of the present invention.

In an embodiment of FIG. 7, the mechanical angle A of the magnetic pole pitches P1 and P4 is 91.25°, and the mechanical angle B of the magnetic pole pitches P2 and P3 is 88.75°.

In the above embodiment, so the magnetic pole of the electrical angle one-cycle, which comprises the magnetic salient pole portions and the N-pole magnet and the S-pole magnet, is unevenly arranged, there is the follow structure for obtaining the skew effect in case that the magnetic pole of the electrical angle one-cycle, which comprises the magnetic salient pole portions and the N-pole magnet and the S-pole magnet, is evenly arranged. That is, the rotor structure of the magnetic pole pitch of the electrical angle one-cycle is one stuck, the pitches are skew-arranged to the motor circumference direction every one piece or plural pieces of the stack(s) and each predetermined angle. In the present embodiment, although the magnetic pole pitch of the electrical angle one-cycle, which comprises the magnetic salient pole portions and the N-pole magnet and the S-pole magnet, is evenly arranged, it is possible to reduce the torque ripple and the cogging torque because the stack to configurate a part of the rotor is skewed every predetermined piece to the circumference direction.

As well, as mentioned above, although the embodiment is explained in case that the magnet is eight poles and the stator core is twelve slots, number of the magnetic pole and number of the slot are voluntary, and the motor phase number is also selective.

EXPLANATION OF REFERENCE NUMERALS 1 steering wheel (handle)
2 column shaft (steering shaft, handle shaft)
10 torque sensor
12 vehicle speed sensor
14 steering sensor
20, 200, 300 motor
30 control unit (ECU)
210, 310 stator
220, 320 rotor
221, 321 permanent magnet (N-pole, S-pole)

The invention claimed is:

1. A synchronous type motor,
wherein said synchronous type motor has a skew effect in a rotor gap surface of a mechanical angle one-cycle, by that a rotor magnetic pole comprises plural magnetic salient pole portions by means of magnetic material, N-pole magnets and S-pole magnets are alternately arranged on a rotor surface between said magnetic salient pole portions, and magnetic pole pitches of an electrical angle one-cycle, which comprise said magnetic salient pole portions and said N-pole magnets and said S-pole magnets, are unevenly arranged,
wherein a torque generation mechanism due to a magnet torque and a reluctance torque is formed by said magnetic salient pole portions and said N-pole magnets and said S-pole magnets,
wherein said rotor magnetic pole comprises four magnetic pole pitches P1 to P4, mechanical angles of said magnetic pole pitches P1 and P4 are A°, and mechanical angles of said magnetic pole pitches P2 and P3 are B° (≠A°),
wherein a d-axis is an axis that a magnetic flux formed by said N-pole magnets and said S-pole magnets penetrates a rotor to a diameter direction, and a q-axis is an axis that a magnetic flux formed by a stator coil of a stator penetrates said rotor to a diameter direction, wherein Iq is a q-axis component of an armature current, Id is a d-axis component of said armature current, β is a lead angle of a rotational magnetic field for said d-axis, and β shows a phase for said d-axis of an input current, wherein δ is a rotor lead angle for a phase of said rotational magnetic field, and δ is determined based on said uneven magnetic pole pitches and is used for calculating said armature currents Iq and Id, wherein Ld is an inductance of said d-axis and Lq is an inductance of said q-axis, wherein Ia is an amplitude which is a half of a difference between a maximum value and a minimum value of said input current being alternating current, wherein Tr1, Tr2, Tr3 and Tr4 which are respectively reluctance torques in said magnetic pole pitches P1, P2, P3 and P4, are defined as follows:

$$Tr1 = (Lq-Ld) \times Ia^2 \times \sin(\beta-\delta) \times \cos(\beta-\delta)$$

$$Tr2 = (Lq-Ld) \times Ia^2 \times \sin(\beta+\delta) \times \cos(\beta+\delta)$$

$$Tr3 = (Lq-Ld) \times Ia^2 \times \sin(\beta+\delta) \times \cos(\beta+\delta) \text{ and}$$

$$Tr4 = (Lq-Ld) \times Ia^2 \times \sin(\beta-\delta) \times \cos(\beta-\delta),$$

wherein said magnetic pole pitches are unevenly arranged in order to reduce said reluctance torque which is a sum of Tr1, Tr2, Tr3 and Tr4 while phases of armature rotational magnetic fields corresponding to said magnetic pole pitches P1, P2, P3 and P4 are equivalent, by leading or delaying a phase of magnet magnetic field of said rotor side based on said rotor lead angle δ, thereby to reduce a torque ripple or a cogging torque.

2. The synchronous type motor according to claim 1, wherein said mechanical angle A° is 91.25°, and said mechanical angle B° is 88.75°.

3. An electric power steering apparatus that is equipped with said synchronous type motor according to claim 1, and applies an assist power to a vehicle steering system by means of a current command value calculated based on a steering torque at least.

4. A vehicle that is equipped with said electric power steering apparatus according to claim 3.

5. A synchronous type motor, wherein said synchronous type motor has a skew effect by being line-symmetrically magnetic pole-arranged at a range of a mechanical angle 180°, by that a rotor magnetic pole comprises plural magnetic salient pole portions by means of magnetic material, N-pole magnets and S-pole magnets are alternately arranged on a rotor surface between said magnetic salient pole portions, and magnetic pole pitches of an electrical angle one-cycle, which comprise said magnetic salient pole portions and said N-pole magnets and said S-pole magnets, are unevenly arranged, wherein a torque generation mechanism due to a magnet torque and a reluctance torque is formed by said magnetic salient pole portions and said N-pole magnets and said S-pole magnets, wherein said rotor magnetic pole comprises four magnetic pole pitches P1 to P4, mechanical angles of said magnetic pole pitches P1 and P4 are A°, and mechanical angles of said magnetic pole pitches P2 and P3 are B° (≠A°), wherein a d-axis is an axis that a magnetic flux formed by said N-pole magnets and said S-pole magnets penetrates a rotor to a diameter direction, and a q-axis is an axis that a magnetic flux formed by a stator coil of a stator penetrates said rotor to a diameter direction, wherein Iq is a q-axis component of an armature current, Id is a d-axis component of said armature current, β is a lead angle of a rotational magnetic field for said d-axis, and β shows a phase for said d-axis of an input current, wherein δ is a rotor lead angle for a phase of said rotational magnetic field, and δ is determined based on said uneven magnetic pole pitches and is used for calculating said armature currents Iq and Id, wherein Ld is an inductance of said d-axis and Lq is an inductance of said q-axis, wherein Ia is an amplitude which is a half of a difference between a maximum value and a minimum value of said input current being alternating current, wherein Tr1, Tr2, Tr3 and Tr4 which are respectively reluctance torques in said magnetic pole pitches P1, P2, P3 and P4, are defined as follows:

$$Tr1 = (Lq-Ld) \times Ia^2 \times \sin(\beta-\delta) \times \cos(\beta-\delta)$$

$$Tr2 = (Lq-Ld) \times Ia^2 \times \sin(\beta+\delta) \times \cos(\beta+\delta)$$

$$Tr3 = (Lq-Ld) \times Ia^2 \times \sin(\beta+\delta) \times \cos(\beta+\delta) \text{ and}$$

$$Tr4 = (Lq-Ld) \times Ia^2 \times \sin(\beta-\delta) \times \cos(\beta-\delta),$$

wherein said magnetic pole pitches are unevenly arranged in order to reduce said reluctance torque which is a sum of Tr1, Tr2, Tr3 and Tr4 while phases of armature rotational magnetic fields corresponding to said magnetic pole pitches P1, P2, P3 and P4 are equivalent, by leading or delaying a phase of magnet magnetic field of said rotor side based on said rotor lead angle δ, thereby to reduce a torque ripple or a cogging torque.

6. The synchronous type motor according to claim 5, wherein said mechanical angle A° is 91.25°, and said mechanical angle B° is 88.75°.

7. An electric power steering apparatus that is equipped with said synchronous type motor according to claim 5, and applies an assist power to a vehicle steering system by means of a current command value calculated based on a steering torque at least.

8. A vehicle that is equipped with said electric power steering apparatus according to claim 7.

* * * * *